US005556647A

United States Patent [19]
Abe et al.

[11] Patent Number: 5,556,647
[45] Date of Patent: Sep. 17, 1996

[54] ENCAPSULATION MOLD

[75] Inventors: Mitsuhiro Abe, Hirakata; Mitsuo Yamada, Osaka, both of Japan

[73] Assignee: Matsushita Electric Industrial Co., Ltd., Osaka-fu, Japan

[21] Appl. No.: 350,525

[22] Filed: Dec. 7, 1994

[30] Foreign Application Priority Data

Mar. 7, 1994 [JP] Japan ....................................... 6-35515

[51] Int. Cl.⁶ ..................................................... B29C 45/02
[52] U.S. Cl. ............... 425/127; 264/272.11; 264/272.14; 264/328.8; 425/129.1; 425/572
[58] Field of Search ................................. 425/127, 129.1, 425/572; 264/328.8, 272.11, 272.14

[56] References Cited

U.S. PATENT DOCUMENTS

| | | | |
|---|---|---|---|
| 4,513,942 | 4/1985 | Creasman | 425/129.1 |
| 4,653,993 | 3/1987 | Boschman | 425/129.1 |
| 5,174,942 | 12/1992 | Barnadas | 425/572 |
| 5,435,953 | 7/1995 | Osada et al. | 425/129.1 |

FOREIGN PATENT DOCUMENTS

| | | |
|---|---|---|
| 3-2048 | 1/1991 | Japan . |
| 4-147814 | 5/1992 | Japan . |
| 6-132331 | 5/1994 | Japan . |

*Primary Examiner*—Tim Heitbrink
*Attorney, Agent, or Firm*—Wenderoth, Lind & Ponack

[57] ABSTRACT

An encapsulation mold includes a pot for heating resin inserted therein, a plunger, movably arranged in the pot, for extruding the resin from a bottom of the pot, and first and second retainer plates. One of the retainer plates includes a plurality of package portions, connected to the runners, for encapsulating electric elements with the resin by inserting the resin into the package portions, a cull portion, arranged at the bottom of the pot, for uniformly extruding the resin from the pot, and runners, connecting the cull portion to the package portions, for feeding the resin extruded from the pot by the plunger to the package portions through the runners. The runners have longitudinal projections provided along a flowing direction of the resin at a central part of each of the runners.

20 Claims, 10 Drawing Sheets

ENCAPSULATION MOLD

BACKGROUND OF THE INVENTION

The present invention relates to an encapsulation mold to be used when small electric elements such as semiconductor elements or other kinds of electric components are encapsulated by thermosetting resin.

A conventional example of the aforementioned encapsulation mold will be first described with reference to FIGS. 19–24.

FIG. 19 is a plan view of a lower retainer plate 50 of the mold. A center plate 41 with a cull portion 42, first runners 43, and second runners 44 is set at the center of the lower retainer plate 50. A third runner 46 at each insertion section 49 of the lower retainer plate 50 has a runner entrance 45 opened at an exit of the second runner 44. The third runner 46 has gate portions 47 and package portions 48.

FIG. 20 is a sectional view of the lower retainer plate 50 of FIG. 19 taken along the line XX—XX, more specifically, the left side from the center of the diagram shows a sectional view of the cull portion 42 and the right side is a sectional view of the second and third runners 44, 46. FIG. 21 indicates the in use state of the encapsulation mold. An upper retainer plate D is secured to a fixed side of a press (not shown) and a pot C for heating inserted resin D is placed at the center of the upper retainer plate C. A plunger B presses out the resin A heated in the pot C.

The lower retainer plate 50 is mounted at a vertically movable part of the press and moved up and down so that the cull portion 42 of the center plate 41 is coincident in position with the pot C. After the lower retainer plate 50 is pressed to the upper retainer plate D, the resin A is injected and molded, and after molding, the lower retainer plate 50 is detached from the upper retainer plate D. A molded product is separated from each of the package portions 48 of the lower retainer plate 50.

FIG. 22 is a sectional view along line XXII—XXII of FIG. 19 showing the first runner 43, FIG. 23 is a sectional view along line XXIII—XXIII of FIG. 19 showing the second runner 44, and FIG. 24 is a sectional view along line XXIV—XXIV of FIG. 19 showing the third runner 46.

The operation of the conventional mold will be described with reference to FIGS. 19–24.

Referring first to FIG. 21, the lower retainer plate 50 is moved upward to make the cull portion 42 of the center plate 41 agree with the pot C in position, and is then pressed against the upper retainer plate D. While the pot C is empty, the plunger B is raised and both the upper and the lower retainer plates D, 50 are heated to a setting temperature of the thermosetting resin by a built-in heater (not shown).

Subsequently, a block of the resin A which has been pre-heated in a preceding process is inserted in the pot C, and the plunger B the temperature of which has been preliminarily raised is moved down to press the inserted resin A. When the resin A is heated and melted by the conduction of heat from the pot C, plunger B, and cull portion 42, the plunger B impresses an injection force to the melting resin A, so that the resin A is uniformly pushed out from the cull portion 42 to each first runner 43.

The extruded resin A in the melted state is, through the first runners 43, second runners 44, and third runners 46, filled in the package portions 48. The filled resin is started to be thermally set. After a predetermined setting time, the lower retainer plate 50 is lowered and the molded products are taken out from the package portions 48.

In the above-described arrangement of the mold, the resin A is heated by the conduction of heat from the pot C, plunger B, and cull portion 42. However, it takes much time to raise the temperature of the resin A of a small thermal conductivity to attain sufficient viscosity for injection, leading to an increase of the encapsulating time.

Moreover, the resin heated to the encapsulating temperature has lower viscosity and accordingly better fluidity, and then the viscosity is increased and the fluidity is decreased when setting is started. It is desirable to perform the encapsulation while the resin has good fluidity. If many small electric elements are to be encapsulated concurrently in many package portions 48 so as to improve the productivity, the situation requires an extension of the first, second, and third runners 43, 44, 46. The resin becomes disadvantageously set during running in the long runners. For overcoming this disadvantage, it is necessary to enlarge the sectional areas of the runners and shorten the running time of the resin in the long runners. However, this gives rise to another disadvantage that more resin is left in the long runners, thus reducing the efficiency with which the resin is used.

If the sectional areas of the runners are increased to shorten the running time of the resin in the runners, the resin passes therethrough without the heat from the cull portion 42 and the first, second, and third runners 43, 44, 46 being transmitted to the central part of the resin, resulting in the temperature difference between the outer part and the central part of the flowing resin in the runners. The resin of the encapsulated products shows poor characteristics by lacking uniformity and including voids and the like.

SUMMARY OF THE INVENTION

The object of the present invention is therefore to provide an encapsulation mold which makes uniform the temperature at each part of flowing resin, shortens the encapsulating time, and eliminates voids or not perfectly encapsulated parts.

In accomplishing these and other objects, according to one aspect of the present invention, there is provided an encapsulation mold comprising:

a pot for heating resin inserted therein;

a plunger, movably arranged in the pot, for extruding the resin from a bottom of the pot; and first and second retainer plates, one of the retainer plates including:
  a plurality of package portions, connected to the runners, for encapsulating electric elements with the resin by inserting the resin into the package portions;
  a cull portion, arranged at the bottom of the pot, for uniformly extruding the resin from the pot; and
  runners, connecting the cull portion to the package portions, for feeding the resin extruded from the pot by the plunger to the package portions through the runners, the runners having longitudinal projections provided along a flowing direction of the resin at a central part of each of the runners.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
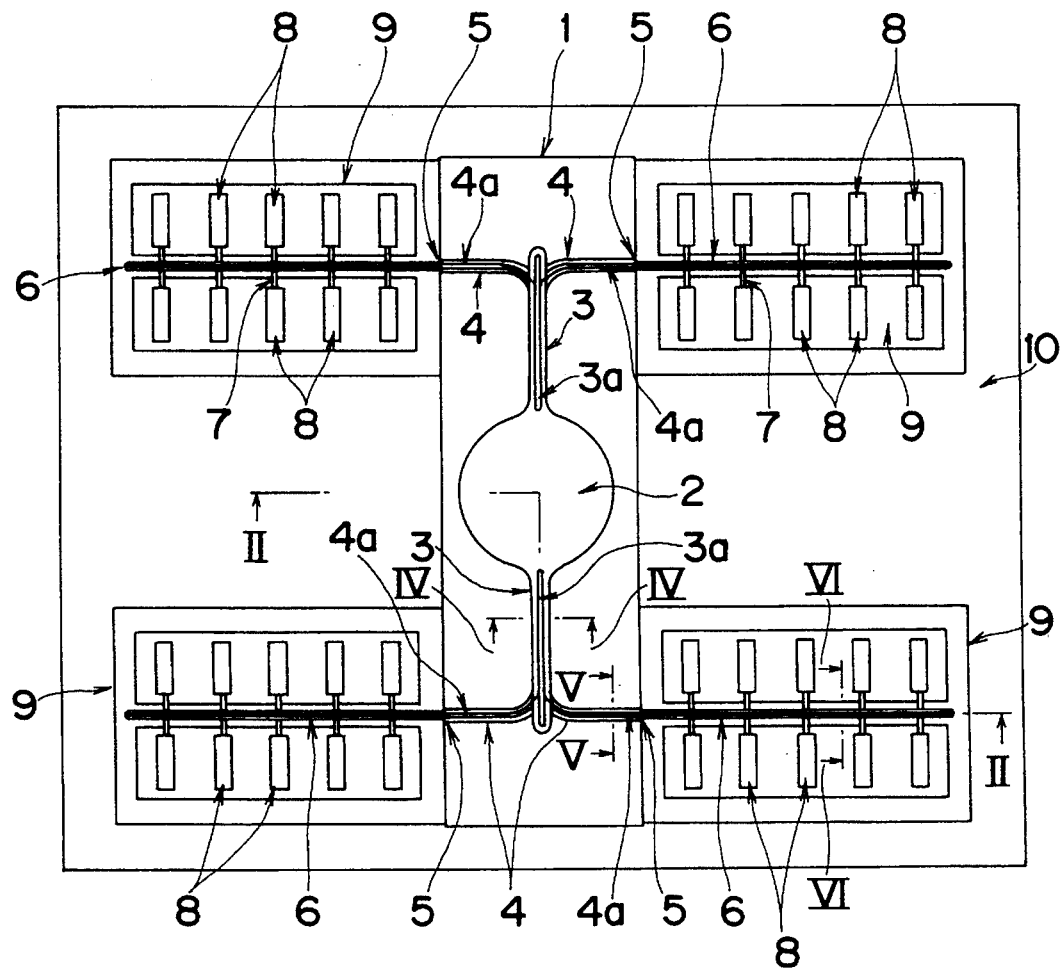
FIG. 1 is a plan view of an encapsulation mold of a first embodiment of the present invention.

Before the description of the present invention proceeds, it is to be noted that like parts are designated by like reference numerals throughout the accompanying drawings.

Encapsulation molds of embodiments of the present invention will be discussed hereinbelow with reference to FIGS. 1–18.

An encapsulation mold of a first embodiment will be described with reference to FIGS. 1–6.

FIG. 1 is a plan view of a lower retainer plate 10 of the encapsulation mold. A center plate 1 is arranged at the center of the lower retainer plate 10. A recessed cull portion 2 is disposed at the central part of the center plate 1. First runners (or runner grooves) 3 are elongated from the cull portion 2 in the upper and lower directions in FIG. 1, and second runners (or runner grooves) 4 are elongated from a portion in the vicinity of the end of each first runner 3 toward sections 9. A third runner (or runner groove) 6 formed in the insertion section 9 of the lower retainer plate 10 has an entrance 5 opening opposite at an exit of each second runner 4, as well as gate portions 7 and recessed package portions 8. The first embodiment is characterized by longitudinal projections 3a, 4a, 6a formed in the respective first, second, and third runners 3, 4, 6 along the running direction of resin to directly transmit the heat from the mold to the central part of the flow of the resin.

Figure 2:
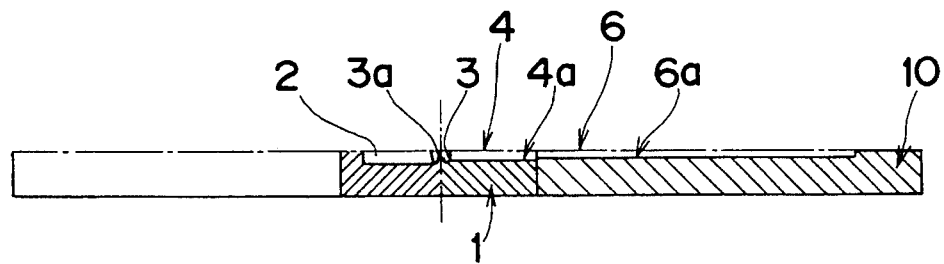
FIG. 2 is a sectional view of a lower retainer plate of the mold in FIG. 1 taken along a line II—II in FIG. 1.
Figure 3:
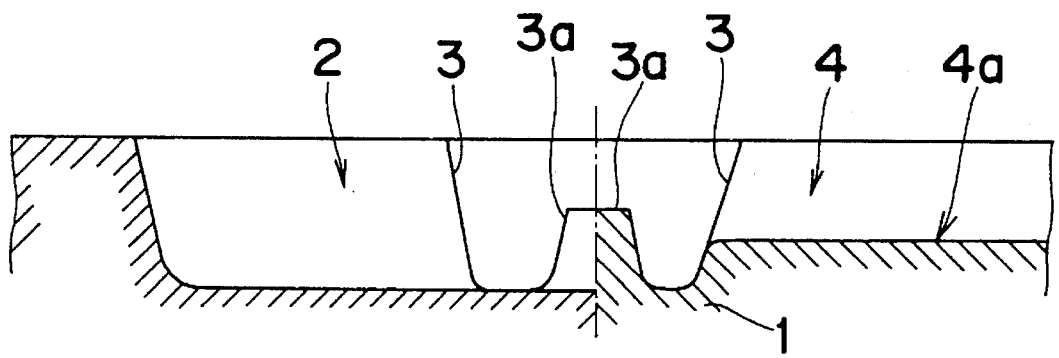
FIG. 3 is an enlarged sectional view of a part of the lower retainer plate in FIG. 2.

FIG. 2 is a sectional view of the lower retainer plate 10 taken along a line II—II of FIG. 1, and FIG. 3 is a partially enlarged view of FIG. 2. The left side of each of FIGS. 2 and 3 with respect to the center line shows a sectional view of the cull portion 2 with the first runner 3 and the longitudinal projection 3a. On the other hand, the right side of each of FIGS. 2 and 3 shows sectional views of the first, second, and third runners 3, 4, 6 with the longitudinal projections 3a, 4a, 6a.

Figure 4:
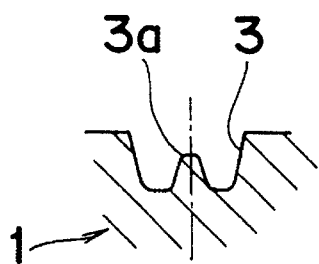
FIGS. 4, 5, and 6 are enlarged sectional views of first, second, and third runners of the mold taken along lines IV—IV, V—V, and VI—VI in FIG. 1.
Figure 5:
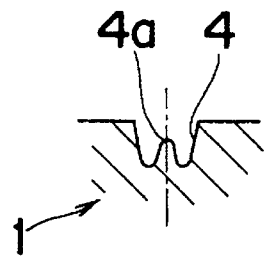
Figure 6:
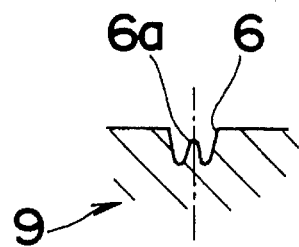

FIGS. 4, 5, and 6 are a cross-sectional view of the first runner 3 taken along a line IV—IV line in FIG. 1, a cross-sectional view of the second runner 4 taken along a line V—V in FIG. 1, and a cross-sectional view of the third runner 6 taken along a line VI—VI in FIG. 1. As shown in FIGS. 4–6, each projection 3a, 4a, 6a has a curved surface from a bottom to a center of each runner 3, 4, 6 in cross-section and has a height smaller than an edge of the runner 3, 4, 6 so as to not completely divide the runner 3, 4, 6 into two sections in its sectional area and so as to surely contact the central part of the flowing resin A with the projection 3a, 4a, 6a.

Figure 21:
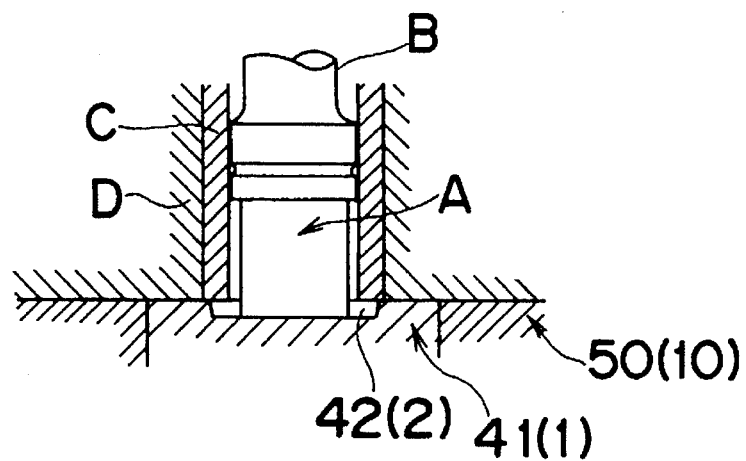
FIG. 21 is an enlarged sectional view of a part of the conventional mold in FIG. 20.
Figure 22:
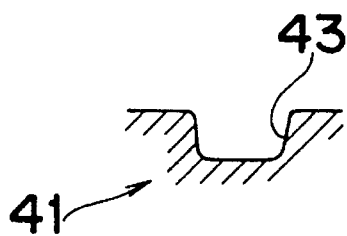
FIGS. 22, 23, and 24 are enlarged sectional views of first, second, and third runners of the conventional mold taken along lines XXII—XXII, XXIII—XXIII, and XXIV—XXIV in FIG. 19.
Figure 23:
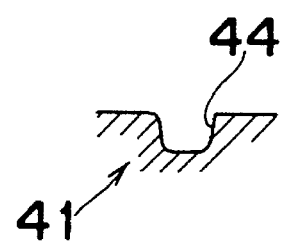
Figure 24:
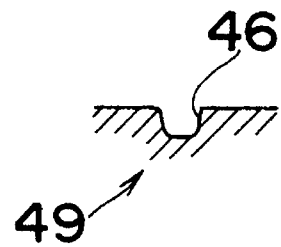

The lower retainer plate 10 is mounted to a vertically movable part of a press (not shown) and moved up and down so that the cull portion 2 of the center plate 1 can be aligned in position with a resin-heater pot C, as shown in FIG. 21. Then, the lower retainer plate 10 is pressed against an upper retainer plate D to inject and mold resin A. After molding, the lower retainer plate 10 is separated from the upper retainer plate D, and molded products are taken out from the package portions 8 of the lower retainer plate 10.

Hereinbelow, the operation of the above mold will be described with reference to FIGS. 1–6 and 21.

In the first place, in FIG. 21, the lower retainer plate 10 is moved upward and pressed against the upper retainer plate D in the state that the cull portion 2 of the center plate 1 is registered with the pot C. While the pot C is empty, the resin-extruder plunger B is raised and the upper retainer plate D and the lower retainer plate 10 are heated by built-in heaters (not shown) to approximately 180° C. which is the setting temperature of the thermosetting resin.

Then, the resin A for encapsulation in the shape of a block and preliminarily heated to about 70° C. in the previous step is inserted into the pot C. The plunger B which is heated beforehand is lowered to impress a preliminary pressure to the resin A. The resin A is heated and melted by the heat transmitted from the pot C, plunger B, and cull portion 2. In this state, the plunger B adds an injection pressure to the melting resin A to thereby extrude the resin A out from the cull portion 2 to each first runner 3 uniformly.

The extruded resin A in the melted state is filled into the package portions 8 through the first, second, and third runners 3, 4, 6. The filled resin A starts to be set. A predetermined setting time later, the lower retainer plate 10 is moved downward and each molded product is taken out from the package portion 8.

In the first embodiment, the first, second, and third runners 3, 4, 6 are respectively provided with longitudinal projections 3a, 4a, 6a. The longitudinal projections are high enough to touch the center of the flow of the resin in cross section which runs in the runners 3, 4, 6. Therefore, it becomes easy for the heat of the mold to reach the central part of the resin through the longitudinal projections 3a, 4a, 6a, thus eliminating the temperature difference between the outer side and the central part of the flowing resin. The uniformity of the resin is improved and the fluidity is increased. Even if each sectional area of the runners 3, 4, 6 is made smaller than that of the conventional one, the feeding amount of resin to the package portions 8 is sufficiently secured. Moreover, the waste amount of resin left in the runners 3, 4, 6 is decreased. The efficiency in using the resin is improved several times as compared with the conventional example.

The temperature at each part of the flowing resin in the runners 3, 4, 6 is kept uniform and the average temperature is raised, so that the uniformity and the fluidity of the resin are enhanced. Accordingly, the temperature of the resin when the plunger B starts extrusion is lower than that in the conventional example, and the waiting time for the resin in the pot C to rise to the necessary temperature is reduced, thereby shortening the encapsulation tact time.

Further, since the uniformity and the fluidity of the encapsulating resin are enhanced, the resin can be inserted into the package portions 8 uniformly. The encapsulated resin accordingly shows uniform characteristics, without accompanying voids or not-filled parts.

A second embodiment of the present invention will now be discussed with reference to FIGS. 7–12 and 21.

An encapsulation mold according to the second embodiment shown in FIGS. 7–12 is the same as the mold of the first embodiment in FIGS. 1–6 except for a cull portion 20. The same parts are designated by the same reference numerals, the description of which will be abbreviated for brevity.

Figure 7:
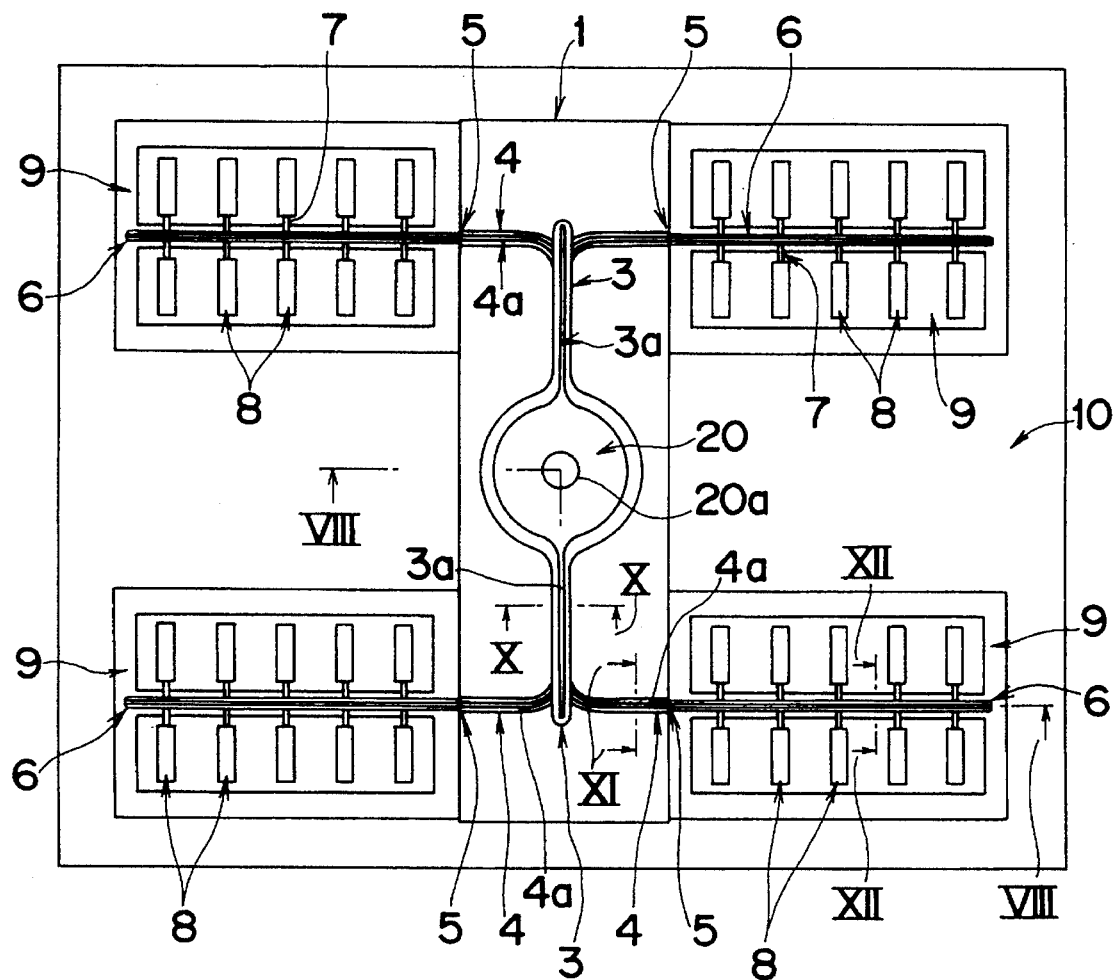
FIG. 7 is a plan view of an encapsulation mold of a second embodiment of the present invention.
Figure 8:
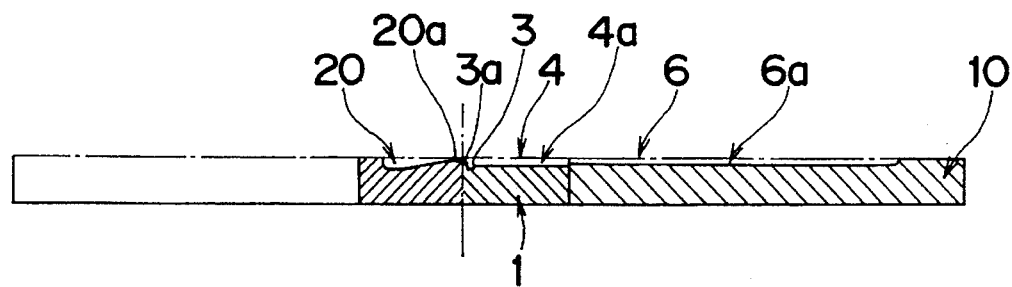
FIG. 8 is a sectional view of a lower retainer plate of the mold in FIG. 7 taken along a line VIII—VIII in FIG. 7.
Figure 9:
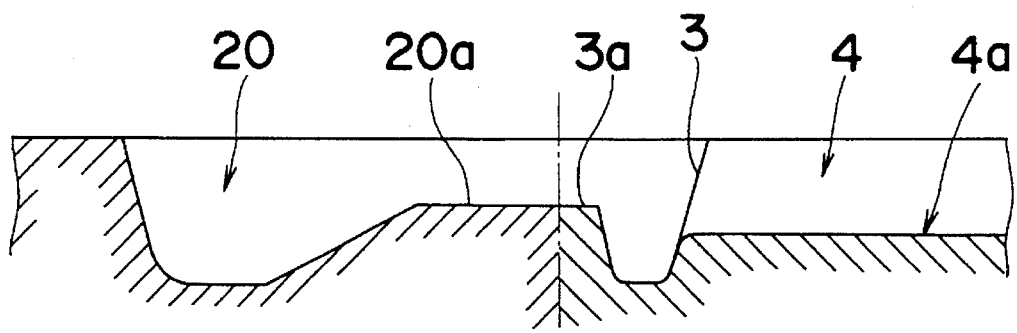
FIG. 9 is an enlarged sectional view of a part of the lower retainer plate in FIG. 8.
Figure 10:
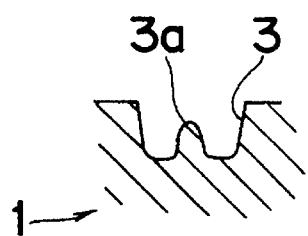
FIGS. 10, 11, and 12 are enlarged sectional views of first, second, and third runners of the mold taken along lines X—X, XI—XI, and XII—XII in FIG. 7.
Figure 11:
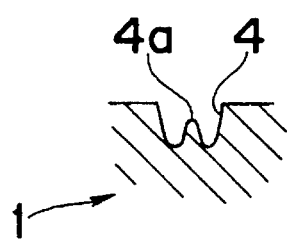
Figure 12:
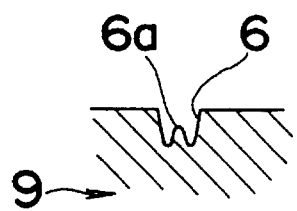

In FIGS. 7–9, a projecting part 20a is formed at the center of the bottom of the cull portion 20. The projecting part 20a works to increase the area of a contact face between the resin A and the mold and lengthen the contact time therebetween before the resin A is pushed by the plunger B out to the first runner 3. Therefore, much more heat is transmitted to the resin A. According to the second embodiment as above, in addition to the effect of the first embodiment, the temperature of the resin in the runners is raised and the fluidity is improved.

Now, a third embodiment of an encapsulation mold will be depicted with reference to FIGS. 13–18 and 21.

A mold of the third embodiment shown in FIGS. 13–18 is the same as the first embodiment in FIGS. 1–6 except for a cull portion 30, and therefore, the same parts are denoted by the same reference numerals and the description thereof will be abbreviated here.

Figure 13:
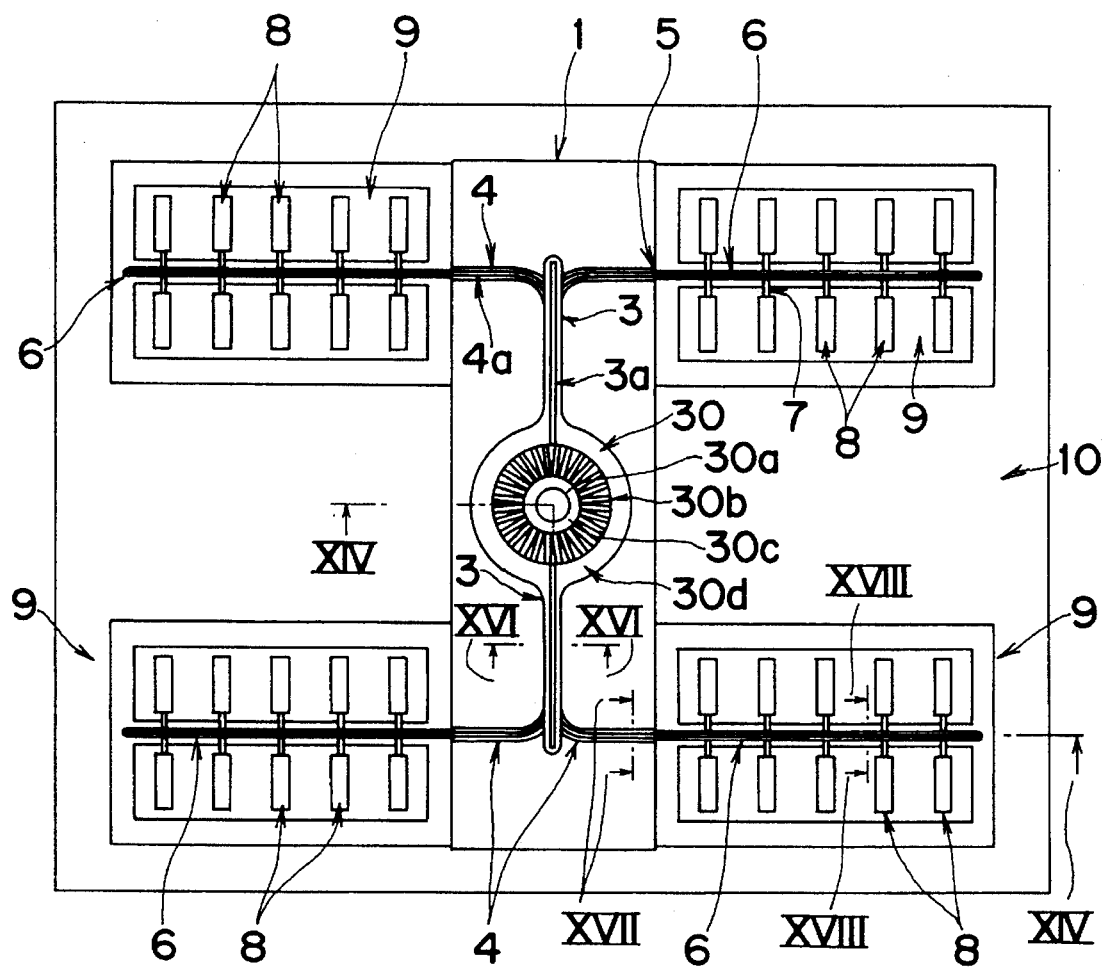
FIG. 13 is a plan view of an encapsulation mold of a third embodiment of the present invention.
Figure 14:
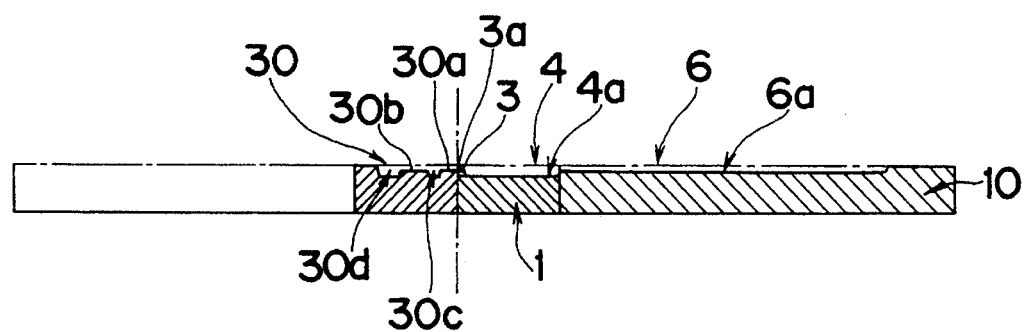
FIG. 14 is a sectional view of a lower retainer plate of the mold in FIG. 13 taken along a line XIV—XIV in FIG. 13.
Figure 15:
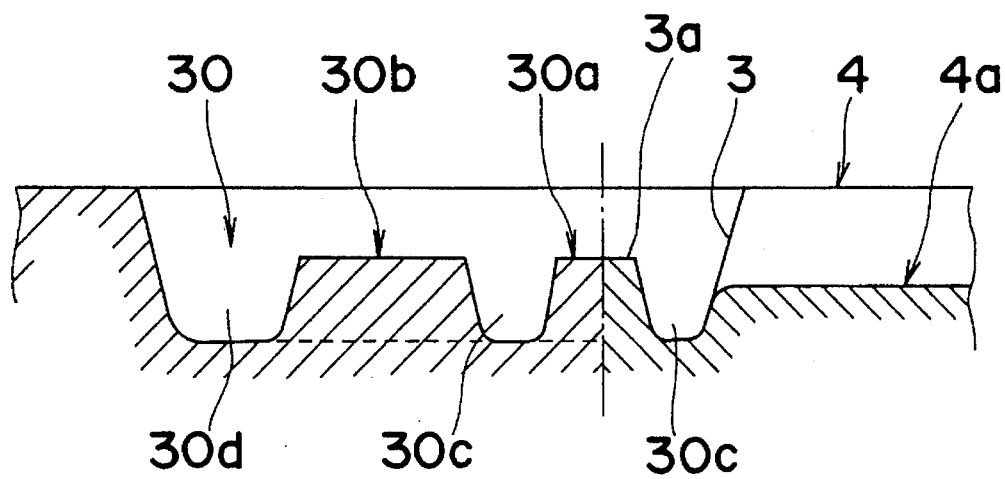
FIG. 15 is an enlarged sectional view of a part of the lower retainer plate in FIG. 14.
Figure 16:
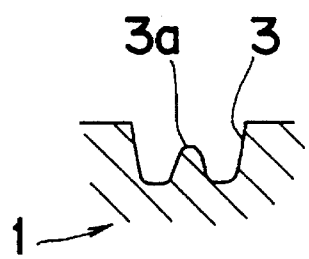
FIGS. 16, 17, and 18 are enlarged sectional views of first, second, and third runners of the mold taken along lines XVI—XVI, XVII—XVII, and XVIII—XVIII in FIG. 13.
Figure 17:
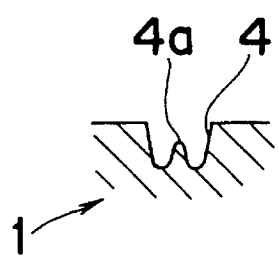
Figure 18:
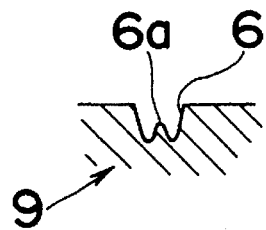
Figure 19:
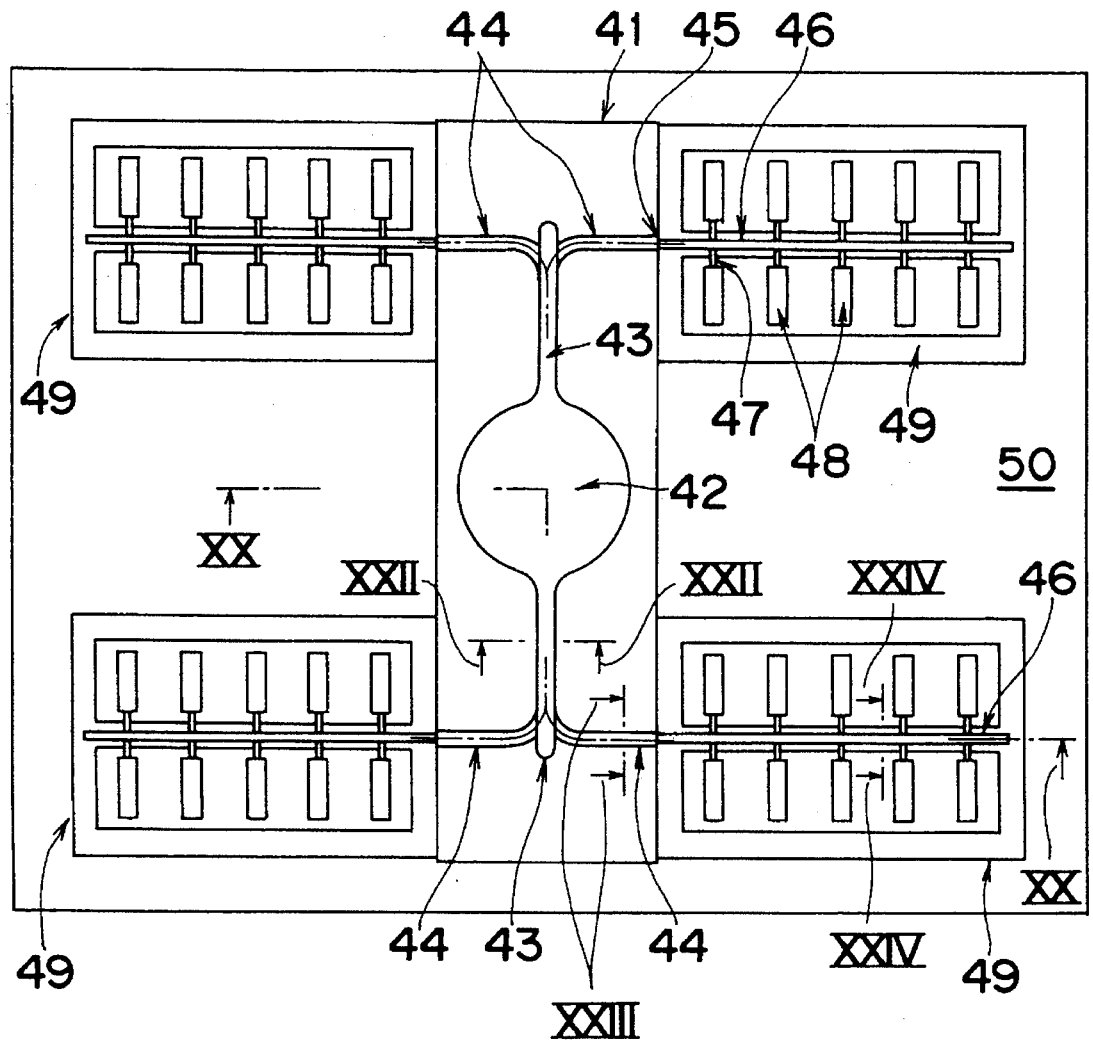
FIG. 19 is a plan view of a conventional encapsulation mold.
Figure 20:
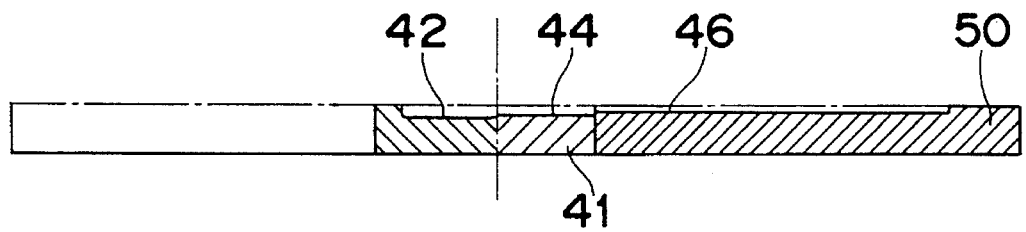
FIG. 20 is a sectional view of a lower retainer plate of the conventional mold in FIG. 19 taken along a line XX—XX in FIG. 19.

Referring to FIGS. 13–15, the cull portion 30 is provided with a concentric projecting part 30a, radial longitudinal projections 30b, radial inner recessed parts 30c, and an annular outer recessed part 30d at the center of the bottom thereof. These parts 30a, 30b, 30c, 30d considerably increase the area of a contact face between the resin A and the mold. Before the resin A is extruded by the plunger B out to the first runner 3 as shown in FIG. 21, the area of the contact face of the resin A with the mold is increased and therefore the contact time is extended. Therefore, in addition to the effects achieved by the first and second embodiments, the temperature of the resin in the runners 3, 4, 6 is kept high to improve the fluidity according to the third embodiment.

The shape of the above-described longitudinal projection, projecting part, and recessed part may be freely designed so long as the feeding amount of the resin to each runner is made uniform and the heat is readily transmitted to the running resin from the mold.

Figure 25:
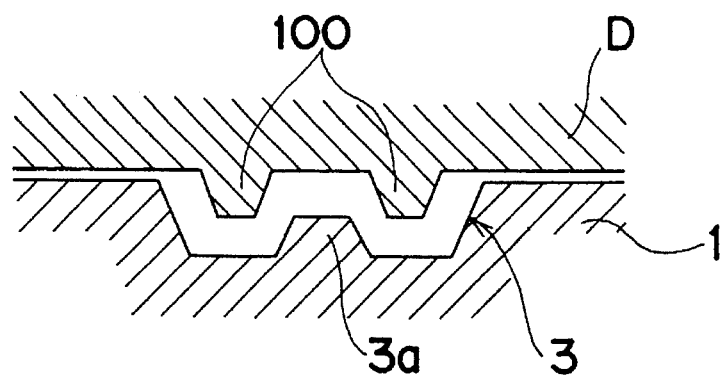
FIG. 25 is a sectional view of a part of the mold according to a modification of the invention.

The upper retainer plate D confronting the lower retainer plate 10 can be flat or instead, can have projections 100 as shown in FIG. 25 protruding in the runner, e.g. runner 3, at both sides of the projection 3a so as to increase the heat transfer area.

Figure 26:
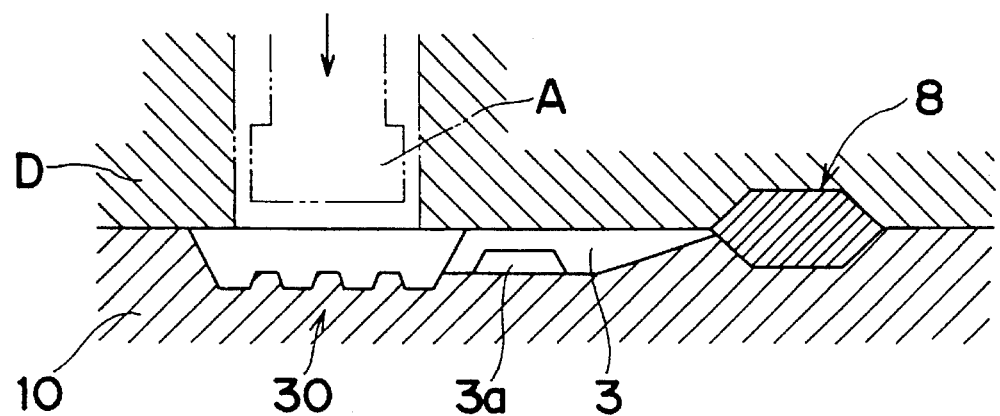
FIGS. 26 and 27 are a sectional view of a mold according to another modification of the embodiment wherein a cull portion and a runner with a projection are formed on only a lower retainer plate, and a sectional view of a mold according to another modification of the embodiment wherein a cull portion and a runner with a projection are formed on only an upper retainer plate, with package portions filled with resin in FIGS. 26 and 27.
Figure 27:
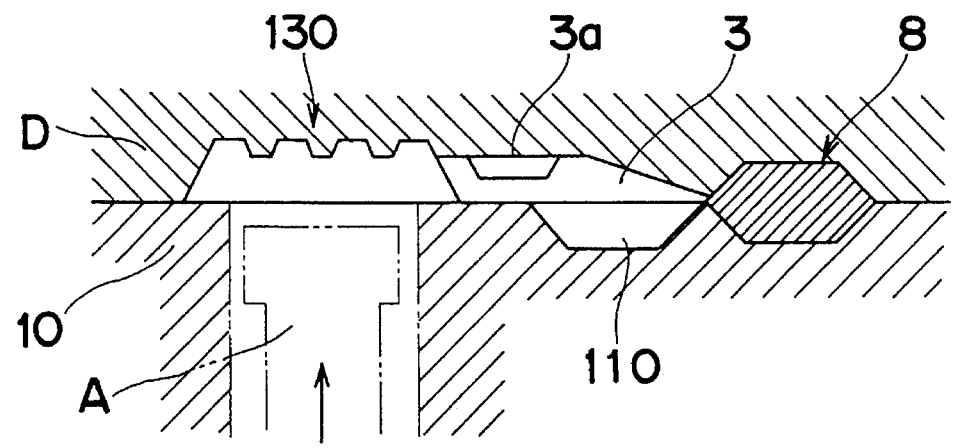

The cull portion 30 and the runner 3 with the projection 3a can be formed on only the lower retainer plate 10 as shown in FIG. 26 or can be formed on only the upper retainer plate D as shown in FIG. 27. In FIG. 27, reference numeral 110 denotes a path for connecting the runner 3 at the upper retainer plate D with the package portion 8.

Figure 28:
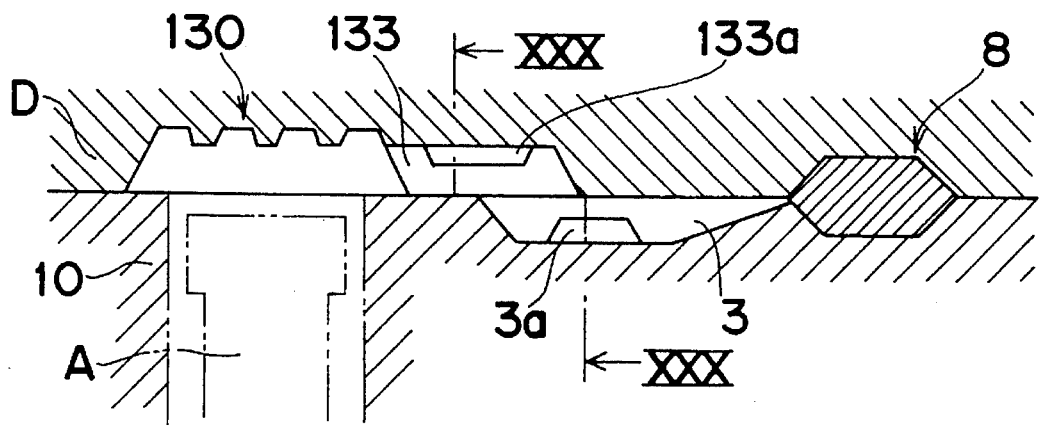
FIGS. 28 and 29 are a sectional view of a mold according to a further modification of the embodiment wherein runners with projections are formed on upper and lower retainer plates with a package portion filled with resin, and an enlarged sectional view of a package portion of the modification taken along a line XXX—XXX in FIG. 28.
Figure 29:
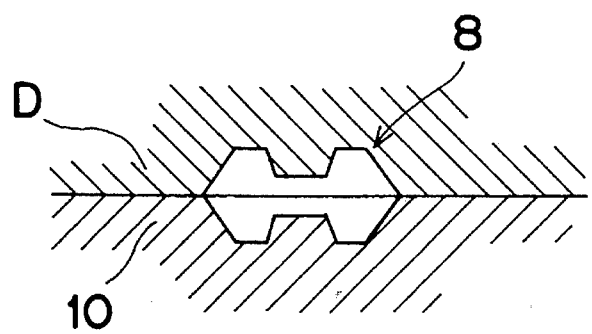

Moreover, as shown in FIG. 28, the cull portion 130 and a runner 133 having a projection 133a similar to the projection 3a can be formed on the upper retainer plate D and the runner 3 with the projection 3a can be formed on the lower retainer plate 10. In this case, each package portion 8 is formed on both retainer plates D and 10 as shown in FIG. 29.

Figure 30:
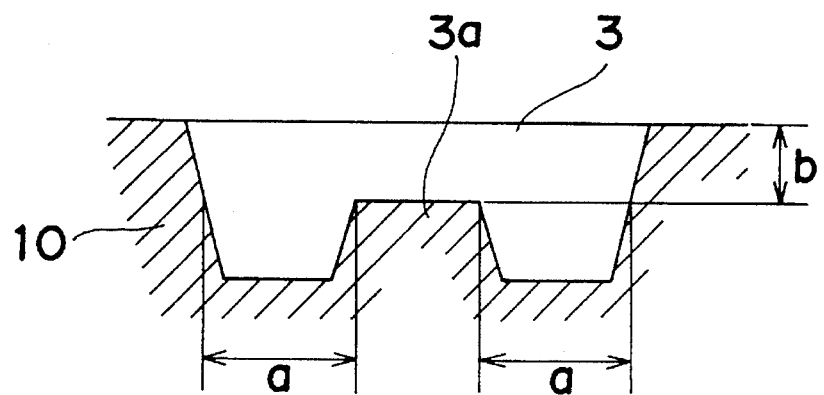
FIG. 30 is a schematical sectional view of a mold according to one of the embodiments for explaining a more specific example.

The projection in the runner is preferably formed so as to perform uniform heat transfer and uniform plasticization by a uniform thickness of the runner. In a more specific example, as shown in FIG. 30, the width a of the bottom surface divided into two by the projection 3a is 2 mm, and the height b of the projection 3a is 2 mm.

In the above modifications in FIGS. 25–30, for simplification of the description, description is provided about the runner 3 with the projection 3a but such modifications can be applied to the other runners 4, 6 with the projections 4a, 6a.

As is clear from the foregoing description of the embodiments of the present invention, the heat of the mold is directly transmitted even to the central part of the resin flowing in the runners due to the longitudinal projections formed in the runners. Therefore, the temperature difference between the outer side and the central part of the flowing resin is decreased, and the encapsulating characteristic of the resin is held uniform. The resin can be uniformly inserted into the package portions and the resin shows better uniformity. At the same time, the viscosity is decreased and the fluidity is improved, whereby the temperature of the resin when the plunger starts extrusion is lowered, leading to reduction of the necessary heating time of the resin in the pot. Accordingly, the encapsulation tact time can be shortened without increasing the pressure of the plunger, and voids or imperfect insertion of the resin can be eliminated.

Since the fluidity of the resin in the runners is improved, the sectional area of the runners can be reduced. The remaining amount of resin in the runners after molding is lessened. The efficiency in using the resin is greatly improved.

Because of the arrangement that the projecting part is formed at the bottom of the cull portion to enlarge the contact area between the resin and the mold, the resin is able to receive much more heat from the mold before flowing into the runners out of the bottom of the cull portion. The temperature of the resin before the start of extrusion by the plunger can be set lower, and the heating time of the resin in the pot is reduced. Accordingly, the encapsulation tact time can be shortened without increasing the pressure of the plunger.

The present invention further features the longitudinal projections, projecting parts, and recessed parts at the bottom of the cull portion to increase the contact area of the resin with the mold. The heat of the mold is directly transmitted from the outer side to the central part of the running resin, so that the temperature of the resin is made uniform and the average temperature is raised. The viscosity is lowered and the fluidity is improved. The temperature of the resin before the plunger starts pushing may be set lower and the heating time of the resin in the pot is reduced. The encapsulation tact time is shortened without increasing the pressure of the plunger, and moreover, voids or not filled parts are not generated.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An encapsulation mold comprising:

first and second retainer plates mounted in mutually confronting relation;

a pot for heating resin inserted therein, said pot being mounted to one of said first and second retainer plates;

a plunger, movably mounted in said pot, for extruding the resin from a bottom of said pot; and wherein one of said retainer plates includes:

a cull portion, arranged opposite said pot, for receiving the resin extruded from said pot;

a plurality of package portions for receiving resin extruded by said plunger from said pot into said cull portion, and for forming electric elements from the resin;

a plurality of runners connected between said cull portion and said package portions for guiding the resin extruded into said cull portion toward and into said package portions; and a longitudinal projection mounted in at least one of said runners so as to project into a central part thereof and extend longitudinally therealong.

2. An encapsulation mold as recited in claim 1, wherein a longitudinal projection is provided in each of a plurality of said runners.

3. An encapsulation mold as recited in claim 1, wherein said plurality of runners includes a plurality of primary runners connected directly to said cull portion, and a plurality of secondary runners connecting between said primary runners and said package portions.

4. An encapsulation mold as recited in claim 3, wherein each of said primary and secondary runners is provided with one of said longitudinal projections.

5. An encapsulation mold as recited in claim 1, wherein said first and second retainer plates comprise upper and lower retainer plates, respectively; and said cull portion, said package portions and said runners are provided in said lower retainer plate.

6. An encapsulation mold as recited in claim 1, wherein a height of said longitudinal projection is less than a height of the respective runner in which said longitudinal projection is mounted.

7. An encapsulation mold as recited in claim 6, wherein in cross section, said longitudinal projection has a curved surface from a bottom to a center of the respective runner in which said longitudinal projection is mounted.

8. An encapsulation mold as recited in claim 1, wherein in cross section, said longitudinal projection has a curved surface from a bottom to a center of the respective runner in which said longitudinal projection is mounted.

9. The encapsulation mold as recited in claim 1, wherein said cull portion has a projecting part concentrically provided at a bottom thereof to increase a contact area of the resin with the one of said first and second retainer plates which is provided with said cull portion.

10. The encapsulation mold as recited in claim 1, wherein said cull portion has radially extending projections provided at a bottom thereof to increase a contact area of resin with the one of said first and second retainer plates which is provided with said cull portion.

11. An encapsulation mold comprising:

first and second retainer plates mounted in mutually confronting relation;

a resin-heater pot into which resin can be inserted, said pot being mounted to one of said first and second retainer plates;

a resin-extruder plunger movably mounted in said pot; and wherein one of said retainer plates includes:

a recessed cull portion arranged opposite said pot and in alignment with said plunger;

a plurality of recessed package portions having predetermined shapes of electric elements to be formed;

a plurality of runner grooves fluidically connected between said cull portion and said package portions; and a longitudinal projection mounted in at least one of said runner grooves, projecting into a central part thereof and extending longitudinally there along.

12. An encapsulation mold as recited in claim 11, wherein a longitudinal projection is provided in each of a plurality of said runner grooves.

13. An encapsulation mold as recited in claim 11, wherein said plurality of runner grooves includes a plurality of primary runner grooves connected directly to said cull portion, and a plurality of secondary runner grooves connecting between said primary runner grooves and said package portions.

14. An encapsulation mold as recited in claim 13, wherein each of said primary and secondary runner grooves is provided with one of said longitudinal projections.

15. An encapsulation mold as recited in claim 11, wherein said first and second retainer plates comprises upper and lower retainer plates, respectively; and said cull portion, said package portions and said runner grooves are provided in said lower retainer plate.

16. An encapsulation mold as recited in claim 11, wherein a height of said longitudinal projection is less than a height of the respective runner groove in which said longitudinal projection is mounted.

17. An encapsulation mold as recited in claim 16, wherein in cross section, said longitudinal projection has a curved surface from a bottom to a center of the respective runner groove in which said longitudinal projection is mounted.

18. An encapsulation mold as recited in claim 11, wherein in cross section, said longitudinal projection has a curved surface from a bottom to a center of the respective runner in which said longitudinal projection is mounted.

19. An encapsulation mold as recited in claim 11, wherein said cull portion has a projecting part concentrically provided at a bottom thereof to increase a contact area of the resin with the one of said first and second retainer plates which is provided with said cull portion.

20. The encapsulation mold as recited in claim 11, wherein
said cull portion has radially extending projections provided at a bottom thereof to increase a contact area of resin with the one of said first and second retainer plates which is provided with said cull portion.

* * * * *